(12) United States Patent
De Perthuis et al.

(10) Patent No.: US 8,707,054 B2
(45) Date of Patent: Apr. 22, 2014

(54) ESTABLISHING A SECURE MEMORY PATH IN A UNITARY MEMORY ARCHITECTURE

(75) Inventors: Hugues De Perthuis, Garcelles (FR); Stephane Mutz, Cuverville (FR)

(73) Assignee: NXP B.V., Eindhoven (NL)

( * ) Notice: Subject to any disclaimer, the term of this patent is extended or adjusted under 35 U.S.C. 154(b) by 25 days.

(21) Appl. No.: 13/139,182

(22) PCT Filed: Nov. 23, 2009

(86) PCT No.: PCT/IB2009/055283
§ 371 (c)(1),
(2), (4) Date: Oct. 3, 2011

(87) PCT Pub. No.: WO2010/070506
PCT Pub. Date: Jun. 24, 2010

(65) Prior Publication Data
US 2012/0023337 A1 Jan. 26, 2012

(30) Foreign Application Priority Data
Dec. 18, 2008 (EP) .................................... 08291211

(51) Int. Cl.
*G06F 21/14* (2013.01)
*H04L 9/32* (2006.01)
*G06F 11/30* (2006.01)
*G06F 1/00* (2006.01)
*H04L 9/00* (2006.01)

(52) U.S. Cl.
USPC ...................................................... 713/190

(58) Field of Classification Search
CPC ........ G06F 12/1081; G06F 21/41; H04L 9/32
See application file for complete search history.

(56) References Cited

U.S. PATENT DOCUMENTS

| | | | | |
|---|---|---|---|---|
| 1,093,056 A | * | 4/1914 | Landsmann et al. | 123/44 R |
| 1,801,700 A | * | 4/1931 | Trindl | 267/1.5 |
| 2006/0259431 A1 | * | 11/2006 | Poisner | 705/51 |
| 2008/0005586 A1 | * | 1/2008 | Munguia | 713/189 |
| 2009/0283442 A1 | * | 11/2009 | McCall et al. | 208/15 |

FOREIGN PATENT DOCUMENTS

| | | | | |
|---|---|---|---|---|
| EP | 1 093 056 A1 | 4/2001 | | |
| EP | 1093056 A1 | * 4/2001 | | G06F 12/14 |
| EP | 1 801 700 A1 | 6/2007 | | |
| EP | 1801700 A1 | * 6/2007 | | |
| JP | 2008025036 A | * 2/2008 | | |
| WO | 2008/025036 A2 | 2/2008 | | |
| WO | WO 2008025036 A2 | * 2/2008 | | G06F 21/00 |

OTHER PUBLICATIONS

Kluter et al., "Speculative DMA for Architecturally Visible Storage in Instruction Set Extensions", Oct. 2008, ACM, pp. 243-248.*
Saidi et al., "Optimizing Explicit Data Transfers for Data Parallel Applications on the Cell Architecture", Jan. 2012, ACM, vol. 8 Issue 4, pp. 37-57.*
Sourdis et al. "Reconfigurable Acceleration and Dynamic Partial Self-Reconfiguration in General Purpose Computing", 2011, IEEE, pp. 1-8.*
Zhong et al., "Affinity-aware DMA Buffer Management for Reducing Off-Chip Memory Access", Mar. 2012, ACM, pp. 1588-1593.*
International Search Report for Application PCT/IB2009/055283 (Mar. 12, 2010).

* cited by examiner

*Primary Examiner* — Eleni Shiferaw
*Assistant Examiner* — Demaris Brown

(57) ABSTRACT

A functional unit of a device is associated with a secret. Data stored in a memory location of the device is encrypted using the secret. The memory location of the device is accessible to other functional units; but without knowledge of the secret, the stored encrypted data is useless. The sharing of the secret creates a secure path between memory locations and functional units of the device while maintaining a unitary memory architecture. This abstract is not to be considered limiting, since other embodiments may deviate from the features described in this abstract.

17 Claims, 2 Drawing Sheets

ESTABLISHING A SECURE MEMORY PATH IN A UNITARY MEMORY ARCHITECTURE

SUMMARY AND BACKGROUND OF THE INVENTION

Many computing systems (personal computers, smart telephones, cable and satellite receivers, DVD players, Blu-ray players, flash-based music players to name a few) utilize a unified memory architecture (UMA) in which the computer processing unit (CPU) communicates with an external memory to store and retrieve data. These data may represent software code, encryption and decryption keys, text, audio, video among other valuable assets. While this architecture is flexible and relatively inexpensive, the external memory is vulnerable to unauthorized access.

In order to utilize the processor efficiently, systems within the computing system may be permitted to have direct access to the external memory (referred to herein as "direct memory access" or "DMA"). Memory access may also be managed by a memory management unit (MMU). A MMU divides the virtual address space (the range of addresses used by the processor) into pages. An application may be allocated certain pages within the virtual memory dynamically and will access the allocated area of memory for the duration of a task. By assigning a program its own virtual space, an operating system can utilize an MMU to impose a form of memory protection against a compromised or foreign application.

One common attack vector for accessing memory content is to use code insertion. For example, software flaws such as buffer/heap overflow vulnerabilities may be used to run unauthorized code on a system. Once an attacker can run its own code on a system, the unified memory between CPU and functional units with DMA is a weak point from a security point of view. For example, units with DMA capabilities can be used to transfer code or data toward external peripherals or possibly to fully overwrite the software stack. In addition, hacked code can be used to observe sensitive data used by some CPU process or by some functional units. This can be done because in most embedded systems, the whole memory space is accessible to all the units with DMA capabilities.

In order to secure the UMA, embodiments described here isolate the shared memory from access by particular processes. One approach to isolate a CPU process is to use the MMU. However, the MMU does not provide control over the DMA performed by hardware functional units, so every device driver and system peripheral can, in principle, access every memory location. For example, although a device driver is prevented from using the CPU to write to a particular page of system memory (perhaps because the page does not belong to the driver's memory space), it may instead program its hardware device to perform a DMA to the page. Thus, a compromised driver could use the DMA capability of the interface port it controls to output the whole memory to the external world or to overwrite code to implement another level of attack.

In some systems, some part of memory can be reserved so as to be accessible by only a few sets of selected functional units. This approach limits memory management flexibility as a specific area of memory must be reserved to specific functional units. This is difficult to implement as it means that all the different operational flows between functional units must be known at design time to ensure the hardware is able to accommodate them. It also impacts software as it means that dynamic memory allocation must take into account the type of data when reserving memory. Also it means that support units such as CPU or hardware accelerators cannot be used to perform operations such as block move.

DETAILED DESCRIPTION OF THE EMBODIMENTS

In an embodiment, the content of external memories is encrypted on the fly. By way of illustration and not as a limitation, an external memory may be SDRAM, DDR or flash.

In another embodiment, memory encryption is used to implement a secure path, between specific functional units, so that although memory is shared, data can be isolated between processes on a "need to know" basis. The secure path may be accomplished by allowing access to a part of a memory to only a few functional units. In this implementation, an access secret in the form of a key or code is shared among the functional units that are to be granted access to the data stored in memory. The data are not otherwise protected.

In an alternative implementation, the data are encrypted in memory. The data are accessible via DMA but the data are meaningless without knowledge of a key or nonce. The encrypted data can be transmitted and repeated openly. In this implementation, a group of functional units that have to communicate together share a common key (or if counter mode is used, a common nonce). Because the encrypted data are accessible, the memory remains unified, operational flow is flexible, software is unaffected and block moves may be performed with only minor modification to block move units (discussed below).

Figure 1:
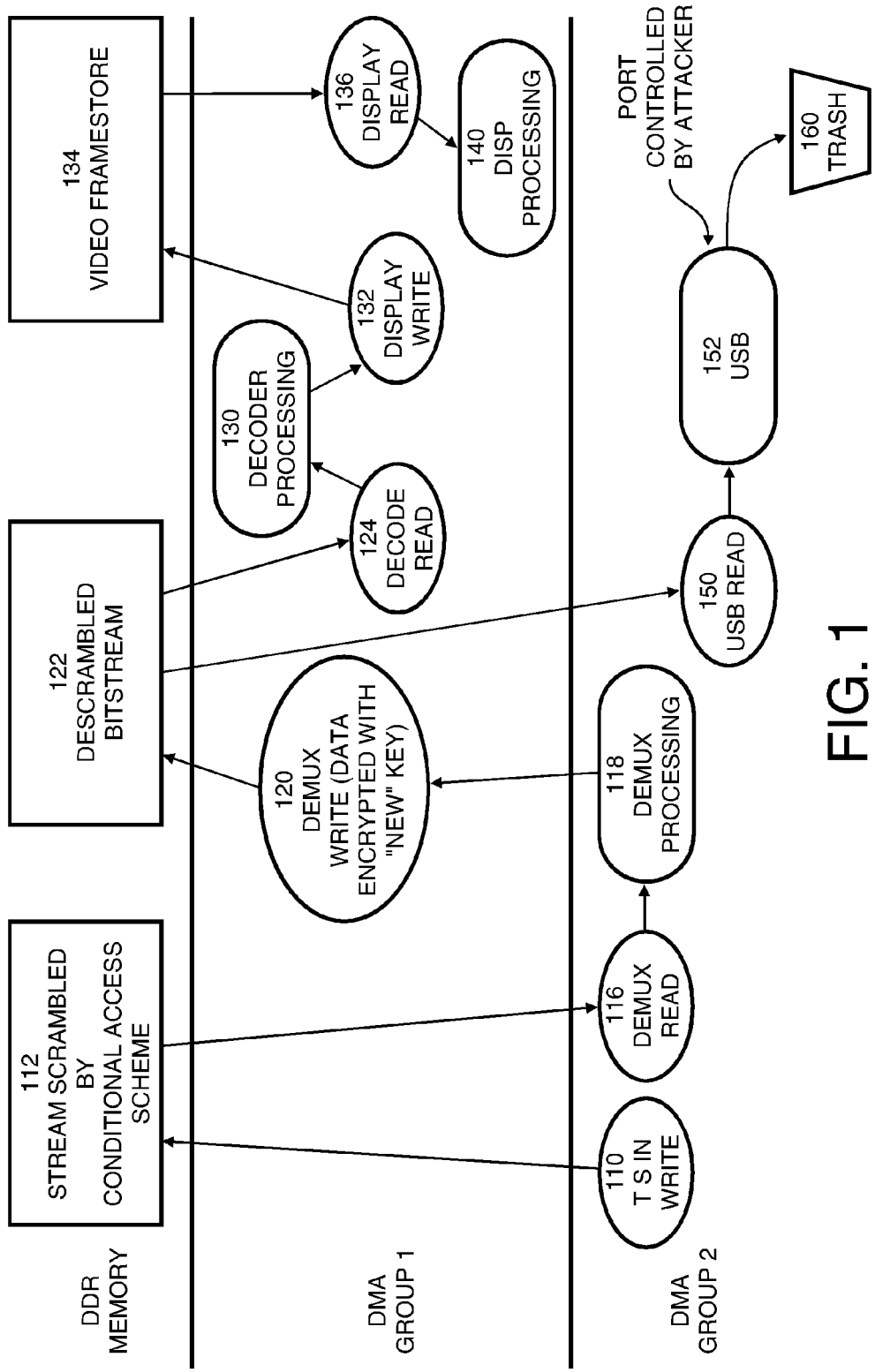
FIG. 1 illustrates a block diagram of a secured path according to an embodiment.

FIG. 1 illustrates a block diagram of a secured path according to an embodiment. In this embodiment, a secure path is created in memory between different interface points in a set top box. However, this is not meant as a limitation. It is anticipated that computing devices performing any number of tasks will employ a secure memory path as described herein.

As illustrated in FIG. 1, encryption is used as a way of authenticating a functional unit that is initiating access to a memory. Instead of protecting memory by restricting access, the data is protected by restricting access to the key or nonce used for encryption. A communication protocol that provides support for explicit initiator identification is used to propagate the identifier of every DMA initiator, so different groups of DMA channels can be created, each of them using a different key (or nonce). If a DMA unit of a functional unit that is assigned to one group of channels accesses the data of another group via its assigned channels, the functional unit will be unable to decrypt the data into a useful form because it does not have the proper key or nonce.

Referring to FIG. 1, a set-top box (STB) receives an encrypted stream from a transport input. The transport stream is written 110 into memory 112 with a given key and read back 116 and sent to demux/descrambler 118 for processing. Demuxed, descrambled data are written 120 to memory 122 but using a different nonce or key than was used to encrypt the transport stream. The descrambled, encrypted data may be accessed by a functional unit that has "knowledge" of the new key or nonce. As illustrated, the data are read 124 and decoded 130 by a decoder unit, written 132 to a video framestore unit 134, read 136 from the framestore unit 134 and processed 140 by a display processing unit for display by other functional units using the same key. In another embodiment, the encrypted transport stream is received from program source and comprises scrambled data using a proprietary scheme. Thus, more than one nonce may be different.

If an attacker takes control of USB port 152, USB port 152 will be able to read the descrambled bitstream 150 from memory 122, but as USB port 152 is not privy to the correct nonce or key, the data will be useless and will be discarded 160.

While FIG. 1 illustrates a device with a single process flow (a fixed flow), this is not meant as a limitation. In other embodiments, the device may perform multiple functions and thus utilize a different flow for each function. In an embodiment, the different channel groups are hardwired in a nonce management unit of an encryption unit. In another embodiment, a nonce management unit is programmed in a secure way, either by using a predefined operational flow, or by a secure processor.

In an embodiment, a CPU may access encrypted data using a key/nonce that is selected either by writing in a register before accessing the memory or by using the address most significant bit (MSB) as a key selection. This will allow the CPU to use the MMU to isolate different processes.

In an embodiment, the CPU's access to the encrypted memory through the MMU is limited to reduce reliance on software. When the CPU needs access to groups that are secured, a DMA engine performs a block move as described below.

In an embodiment, access for internal processing by functional units is performed directly from the zone allocated. FIG. 1 illustrates a secure DMA path using memory encryption and a block move (possibly with some processing) from one part of memory to another. In another embodiment, a block move engine is used to securely move data from one part of memory to another. The block engine comprises a descriptor list that is read from an anchor address in memory set by a register. Each descriptor comprises a source address, a destination address, a number of words to transfer, an operation to accomplish (stream out to external, internal unit, block move, encryption, for example).

Before a DMA transfer can be executed, the descriptor is evaluated to determine which functional unit is initiating the transfer (the functional unit sometimes being referred to herein as an "initiator"), whether the initiator is authorized to access the indicated source of the data, whether the initiator is authorized to write data to the indicated destination address, and whether the combination of source and destination is authorized. By way of illustration and not as a limitation, a transfer may be allowed between encrypted regions but not between encrypted and non-encrypted regions.

In an embodiment, regions are defined by their addresses and the initiator, the source and the destination are verified by reference to look-up table. In another embodiment, regions are defined by the functional unit that is attempting to access data stored at a particular source location. In this embodiment, information regarding the DMA group is used to select the correct key. In an embodiment, the DMA group entitled to access data is encoded into the descriptor as side channel data. In another embodiment, the DMA group is encoded as the MSB of the source address. In this embodiment, the DMA group information is transferred with every command and thus does not require modification or upgrade to the legacy units it will cross.

Multiple process/CPUs, including insecure ones, can initiate access to memory.

Figure 2:
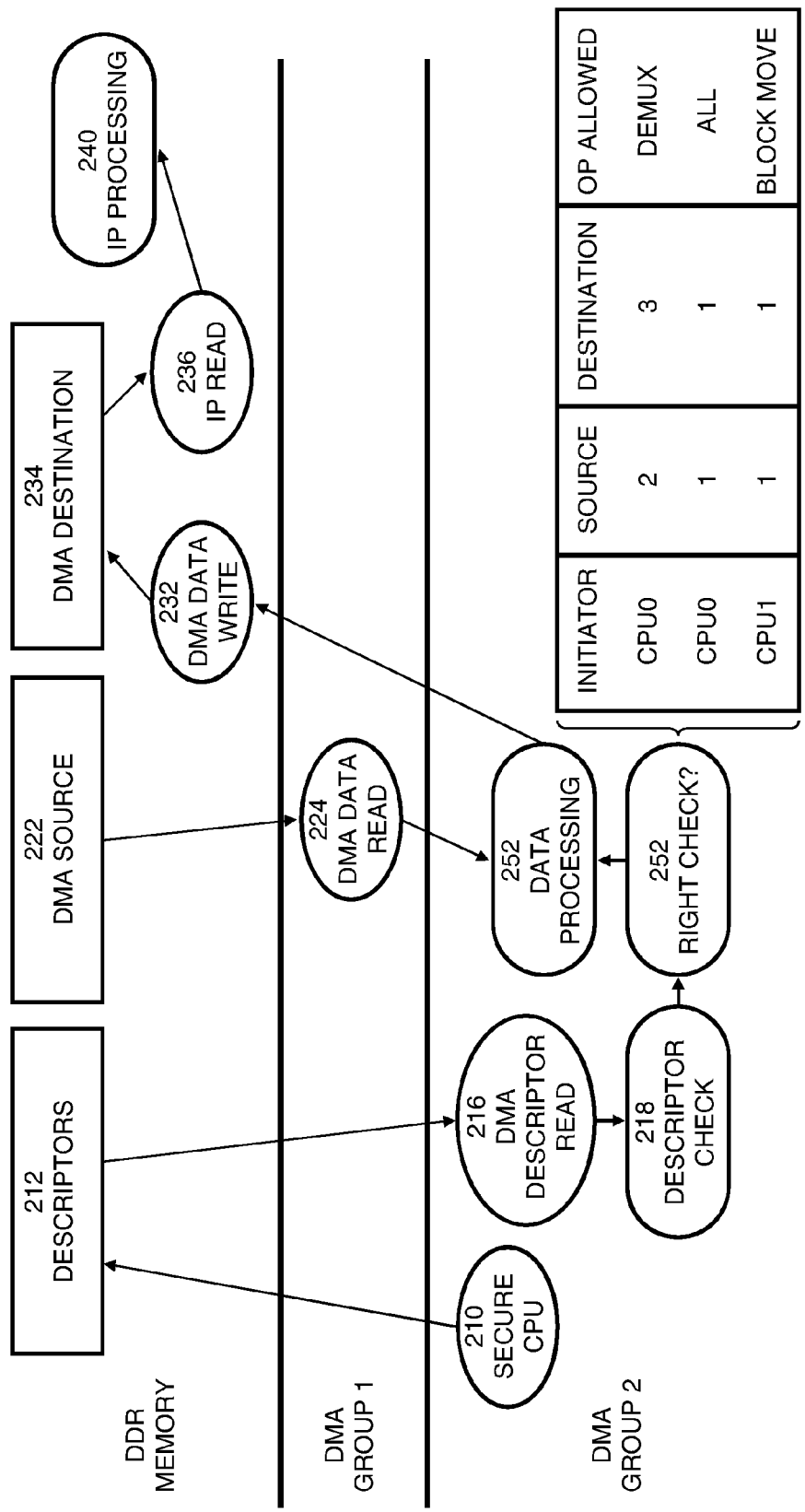
FIG. 2 illustrates a block diagram of a flow of block transfer using descriptors according to an embodiment.

FIG. 2 illustrates a block diagram of a flow of block transfer using descriptors according to an embodiment.

A secure CPU 210 writes descriptors with its key in memory 212. In an embodiment, the CPU 210 uses a shared key only between CPU and descriptor reads to ensure that descriptors cannot be generated by someone else. In another embodiment, to protect against someone patching the memory with previous descriptors, a counter is used.

Descriptors are read from memory 216. In an embodiment, the descriptor comprises a CRC to confirm that the descriptor has not been compromised. In other embodiments, the descriptor is protected by a signature, a hash, or a specific value. Reserved bits may be used for this purpose. This will protect against random descriptors which could trigger unexpected operations. With a correct encryption algorithm, for each bit, there is a 50% chance that by changing a bit of the cipher stream, it toggles to 0, i.e., if there are 8 reserved bits, 256 trials will be good enough to generate a descriptor whose reserved bit is 0. That is why a CRC is more secure as it relies on the other bit of the descriptor.

The combination of source 222, destination 234 and operation is checked against a table 218 to ensure the requested operation is authorized 252. By way of illustration and not as a limitation, a CPU may be permitted to perform all operations, perform only a block move, or initiate a demux process. Block moves may be subject to restrictions. By way of illustration and not a limitation, a block transfer may be permitted within a group and from an unprotected group to a protected group. However, a block transfer may not be permitted from a protected group to an unprotected group. In an embodiment, this checking is performed inside the block move. Alternatively, the checking is performed in a nonce selection unit.

If the operation is authorized then commands are transmitted by the DMA controller to a memory subsystem (not illustrated) and write 232, read 236 and IP processing 240 functions are allowed to proceed. In an embodiment, the memory subsystem will use the address MSB to identify the keys to be used by the encryption unit. Only LSBs will be forwarded to the memory interface.

The scheme presented in FIG. 2 relies on the fact that source and destination are known at the same time so that it can be checked whether transfers from one domain to another are allowed.

Table 1 presents a possible address format.

TABLE 1

| Bit Position | 31..log$_2$(max_memory_size) | log$_2$(max_memory_size) |
|---|---|---|
| Field | dma_group[n] | address[32-n] |

By way of illustration and not as a limitation, assume a memory subsystem utilizes 32-bit addresses and that the total memory is 512 MB. Under these conditions, 8 DMA groups of 64 MB can be created. For direct CPU access to the memory, however, MSBs are also used for memory management, so the number of DMA groups accessible by the CPU could be reduced. This address scheme is most advantageous for functional units that can access multiple DMA groups. For others, functional unit identification may be used for DMA group selection rather than address MSB.

Using the address-based nonce selection process, the nonce will be selected by looking at the address range. There is only one nonce possible. Using the initiator based nonce selection process, the nonce will be selected depending on the ID of the DMA channel. Groups of DMA channels for functional units communicating together will be created.

As previously discussed, a counter mode cipher may be used to protect against someone patching the memory with previous descriptors. While the counter mode has many advantages, it requires that each time data is modified a new nonce value must be used for that data. In an embodiment, a rolling encryption is applied. In this embodiment, a software process describes the mapping of the memory to a rolling encryption unit. This process does not need to be secure. The rolling encryption will ensure that the nonce is updated often enough so that if the map is not correctly described then functional units will not be able to access their data. In an embodiment, MSBs of an address are used to select among several nonces available for a given functional unit, as suggested in Table 1. This could be useful for DMA units but also for operational flows which might have to access several framestores in memory.

In an embodiment, a secure path uses the existing memory encryption of a system to protect against internal attacks by enforcing an isolation of different groups of functional units through the creation of virtual memories which can only be accessed by limited group of functional units. This additional functionality is cheap to implement and greatly increases security level as it helps to protect against hacked software accessing sensitive data.

It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular.

The invention claimed is:

1. A method for establishing a secure memory path comprising:
   associating a first select group of functional units of a device with a first secret, wherein the first select group comprises at least one functional unit;
   encrypting data with the first secret;
   reading the data and re-encrypting the data using a second secret;
   processing the data that are encrypted with a second secret and written in a memory, wherein the second secret is different from the first secret;
   storing the re-encrypted data in the memory,
   wherein the encrypted data are accessible to the first select group of functional units and to other functional units through access to the memory;
   evaluating a descriptor before executing a Direct Memory Access (DMA) transfer to determine which functional unit is initiating transfer of the re-encrypted data by checking whether the functional unit is authorized to access and transfer the re-encrypted data from one domain to another domain and checking whether the combination of the DMA source and DMA destination is authorized;
   when a process of the device requires access to the data stored in the memory, accessing the re-encrypted data by at least one member of the first select group after evaluation of the descriptor; and
   decrypting the encrypted data with the first secret to obtain the data.

2. The method of claim 1, wherein the first secret is selected from a key and a nonce.

3. The method of claim 1, wherein accessing the encrypted data comprises:
   accessing the encrypted data under control of a direct memory access controller.

4. The method of claim 1, wherein the device is selected from a group consisting of a computer, a telephone, a video termination device, a digital video recorder, a CD player, a DVD player, a Blu-Ray player, and a flash-based music player.

5. The method of claim 1, wherein the first select group of functional units comprises at least one functional unit selected from a group consisting of a computer processing unit, a demultiplexer, a decoder, a display processor, and an input/output port.

6. The method of claim 1, wherein a member of the first select group of functional units is also a member of a second select group of functional units.

7. The method of claim 1, wherein associating the first select group of functional units of the device with the first secret comprises:
   creating a descriptor for each functional unit of the device; and
   using the descriptor to associate a functional unit that is a member of the first select group of functional units with the first secret.

8. The method of claim 7, wherein the descriptor comprises a DMA group assignment and wherein the first select group of functional units shares a common DMA group assignment.

9. A method for establishing a secure memory path comprising:
   processing data that are encrypted with a first secret and written in a memory of a device;
   encrypting the processed data with a second secret, wherein the second secret is different from the first secret; and
   storing the encrypted data in the memory, wherein the encrypted data are accessible to a select group of functional units of the device through access to the memory;
   creating a first descriptor for a functional unit of the device, wherein the descriptor comprises a first Direct Memory Access (DMA) group assignment;
   receiving from the functional unit a request to initiate a process requiring access to the encrypted data stored in the memory;
   determining whether the functional unit is authorized to make the request;
   evaluating the first descriptor before executing a DMA transfer to determine which functional unit is initiating transfer of the encrypted data stored by checking whether the functional unit is authorized to access and transfer the encrypted data stored from one domain to another domain and checking whether the combination of DMA source and DMA destination is authorized;
   when the functional unit is authorized to make the request, determining the second secret;
   accessing the encrypted data; and
   decrypting the encrypted data with the second secret to obtain the data.

10. The method of claim 9, wherein the process requires transfer of the encrypted data and wherein the first descriptor further comprises a source address of the encrypted data and a destination address for the encrypted data.

11. The method of claim 10, wherein determining whether the functional unit is authorized to make the request comprises:
    determining whether the transfer of encrypted data may be made from the source address to the destination address.

12. The method of claim 9, wherein the first descriptor further comprises a list of processes that the functional unit may perform and determining whether the functional unit is authorized to make the request comprises:

determining whether the requested process is included in the list.

13. The method of claim 9, wherein the first secret is selected from a key and a nonce.

14. The method of claim 9, wherein accessing the encrypted data comprises:

accessing the encrypted data under control of a direct memory access controller.

15. The method of claim 9, wherein the device is selected from a group consisting of a computer, a telephone, a video termination device, a digital video recorder, a CD player, a DVD player, a Blu-Ray player, and a flash-based music player.

16. The method of claim 9, wherein the select group of functional units comprises at least one functional unit selected from a group consisting of a computer processing unit, a demultiplexer, a decoder, a display processor, and an input/output port.

17. The method of claim 9, further comprising:

creating a second descriptor for the functional unit of the device, wherein the second descriptor comprises a second DMA group assignment.

\* \* \* \* \*